United States Patent [19]

Joo' et al.

[11] 4,376,029

[45] Mar. 8, 1983

[54] TITANIUM DIBORIDE-GRAPHITE COMPOSITS

[75] Inventors: Louis A. Joo', Johnson City; Kenneth W. Tucker, Elizabethton; Frank E. McCown, Bristol, all of Tenn.

[73] Assignee: Great Lakes Carbon Corporation, New York, N.Y.

[21] Appl. No.: 186,181

[22] Filed: Sep. 11, 1980

[51] Int. Cl.$^3$ .................. C25B 11/04; C25C 3/12
[52] U.S. Cl. ................... 204/294; 204/67; 204/290R; 204/291; 252/425.3; 252/506; 252/507; 264/29.5; 264/29.7; 264/61; 423/289; 423/297; 501/96
[58] Field of Search ............ 204/291, 294, 67, 290 R; 264/29.5, 29.7; 423/289, 297; 252/506, 507, 425.3; 501/96

[56] References Cited

U.S. PATENT DOCUMENTS

| | | | |
|---|---|---|---|
| 2,799,912 | 7/1957 | Greger | 264/29.7 |
| 3,202,519 | 8/1965 | Scott | 264/29.5 |
| 3,314,876 | 4/1967 | Ransley | 204/291 |
| 3,351,429 | 11/1967 | Timms | 423/297 |
| 3,400,061 | 9/1968 | Lewis et al. | 204/67 |
| 3,616,045 | 10/1971 | Kozar et al. | 264/29.5 |
| 3,672,936 | 6/1972 | Ehrenneich | 264/29.5 |
| 3,676,371 | 7/1972 | Zollner et al. | 252/507 |
| 4,108,670 | 8/1978 | Steiger et al. | 501/96 |
| 4,111,765 | 9/1978 | DeNora et al. | 204/67 |

FOREIGN PATENT DOCUMENTS

| | | | |
|---|---|---|---|
| 528472 | 6/1955 | Italy | 204/67 |
| 1289081 | 9/1972 | United Kingdom | 204/291 |

*Primary Examiner*—F. Edmundson
*Attorney, Agent, or Firm*—Adrian J. Good

[57] ABSTRACT

A cathode component for a Hall aluminum cell is economically produced from a mixture of a carbon source, preferably calcined petroleum coke, and optionally calcined acicular needle petroleum coke, calcined anthracite coal; a binder such as pitch including the various petroleum and coal tar pitches; titanium dioxide, $TiO_2$; and boric acid, $B_2O_3$ or boron carbide, $B_4C$; forming said mixture into shapes and heating to a $TiB_2$-forming temperature.

3 Claims, No Drawings

TITANIUM DIBORIDE-GRAPHITE COMPOSITS

DESCRIPTION

BACKGROUND OF THE INVENTION

Aluminum metal has been produced for 90 years in the Hall cell by electrolysis of alumina in a molten cryolite salt electrolyte bath operating at temperatures in the range of 900°–1000° C. The reactivity of the molten cryolite, the need for excellent electrical conductivity, and cost considerations have limited the choice of materials for the electrodes and cell walls to the various allotropic forms of carbon.

Typically the Hall cell is a shallow vessel, with the floor forming the cathode, the side walls a rammed coke-pitch mixture, and the anode a block suspended in the bath at an anode-cathode separation of a few centimeters. The anode is typically formed from a pitch-calcined petroleum coke blend, prebaked to form a monolithic block of amorphous carbon. The cathode is typically formed from a pre-baked pitch-calcined anthracite or coke blend, with cast-in-place iron over steel bar electrical conductors in grooves in the bottom side of the cathode.

During operation of the Hall cell, only about 25% of the electricity consumed is used for the actual reduction of alumina to aluminum, with approximately 40% of the current consumed by the voltage drop caused by the resistance of the bath. The anode-cathode spacing is usually about 4–5 cm., and attempts to lower this distance result in an electrical discharge from the cathode to the anode through aluminum droplets.

The molten aluminum is present as a pad in the cell, but is not a quiescent pool due to the factors of preferential wetting of the carbon cathode surface by the cryolite melt in relation to the molten aluminum, causing the aluminum to form droplets, and the erratic movements of the molten aluminum from the strong electromagnetic forces generated by the high current density.

The wetting of a solid surface in contact with two immiscible liquids is a function of the surface free energy of the three surfaces, in which the carbon cathode is a low energy surface and consequently is not readily wet by the liquid aluminum. The angle of a droplet of aluminum at the cryolite-aluminum-carbon junction is governed by the relationship $$\cos \theta = \frac{\alpha_{12} - \alpha_{13}}{\alpha_{23}}$$

where $\alpha_{12}$, $\alpha_{13}$, and $\alpha_{23}$ are the surface free energies at the aluminum carbon, cryolite-carbon, and cryolite-aluminum boundaries, respectively.

If the cathode were a high energy surface, such as would occur if it were a ceramic instead of carbon, it would have a higher contact angle and better wettability with the liquid aluminum. This in turn would tend to smooth out the surface of the liquid aluminum pool and lessen the possibility of interelectrode discharge allowing the anode-cathode distance to be lowered and the thermodynamic efficiency of the cell improved, by decreasing the voltage drop through the bath.

Typically, amorphous carbon is a low energy surface, but also is quite durable, lasting for several years duration as a cathode, and relatively inexpensive. However, a cathode or a $TiB_2$ stud as a component of the cathode which has better wettability and would permit closer anode-cathode spacing could improve the thermodynamic efficiency and be very cost-effective.

Several workers in the field have developed refractory high free energy material cathodes. U.S. Pat. No. 2,915,442, Lewis, Dec. 1, 1959, claims a process for production of aluminum using a cathode consisting of the borides, carbides, and nitrides of Ti, Zr, V, Ta, Nb, and Hf. U.S. Pat. No. 3,028,324, Ransley, Apr. 3, 1962, claims a method of producing aluminum using a mixture of TiC and $TiB_2$ as the cathode. U.S. Pat. No. 3,151,054, Lewis, Sept. 29, 1964, claims a Hall cell cathode conducting element consisting of one of the carbides and borides of Ti, Zr, Ta and Nb. U.S. Pat. No. 3,156,639, Kibby, Nov. 10, 1964, claims a cathode for a Hall cell with a cap of refractory hard metal and discloses $TiB_2$ as the material of construction. U.S. Pat. No. 3,314,876, Ransley, Apr. 18, 1967, discloses the use of $TiB_2$ for use in Hall cell electrodes. The raw materials must be of high purity particularly in regard to oxygen content, Col. 1, line 73-Col. 2, line 29; Col. 4, lines 39–50, Col. 8, lines 1–24. U.S. Pat. No. 3,400,061, Lewis, Sept. 3, 1968 discloses a cathode comprising a refractory hard metal and carbon, which may be formed in a one-step reaction during calcination. U.S. Pat. No. 4,071,420, Foster, Jan. 31, 1978, discloses a cell for the electrolysis of a metal component in a molten electrolyte using a cathode with refractory hard metal $TiB_2$ tubular elements protruding into the electrolyte. The protruding elements enhance electrical conductivity and form a partial barrier to the mechanical agitation caused by magnetic effects.

SUMMARY OF THE INVENTION

Titanium Diboride, $TiB_2$ has been proposed for use as a cathode or cathodic element or component in Hall cells for the reduction of alumina, giving an improved performance over the amorphous carbon and semi-graphite cathodes presently used.

It had previously been known that Titanium Diboride ($TiB_2$) was useful as a cathode in the electrolytic production of aluminum, when retrofitted in the Hall cell as a replacement for the carbon or semi-graphite form. The electrical efficiency of the cell was improved due to better conductivity, due mainly to a closer anode-cathode spacing; and the corrosion resistance was improved, probably due to increased hardness, and lower solubility as compared to the carbon and graphite forms.

The principal deterrent to the use of $TiB_2$ as a Hall cell cathode has been the great cost, approximately $25/lb. as compared to the traditional carbonaceous compositions, which cost about $0.60/lb., and its sensitivity to thermal shock. If the anode-cathode distance could be lowered, the % savings in electricity would be as follows:

| A-C distance | % savings |
| --- | --- |
| 3.8 cm. | std. |
| 1.9 cm. | 20% |
| 1.3 cm. | 27% |
| 1.0 cm. | 30% |

We have invented an improved process for producing a $TiB_2$-carbon composite which shows excellent performance as a cathode or cathode component in Hall aluminum cells, and which is markedly more economical. The method also produces an unexpectedly improved cathode when its performance is compared to the traditional carbonaceous material.

We have found that our method gives an unexpected advantage in that the articles produced in this manner are much more resistant to thermal shock than articles formed by prior art methods using $TiB_2$ powder or reactants processed by previously known methods. In particular, we have found that cathode components for Hall cells are much more resistant to the severe thermal shock imposed on them at the temperature of operation in molten cryolite.

We have also found another unexpected advantage in that we do not need to use the highly purified raw materials specified in the previously known methods. We have also used a commercially pure grade specified to assay at least 98% and typically 99.5% $TiB_2$ and a grade with 99.9% purity. The various grades are referred to herein by their nominal purities as given above.

The method involves the use of pre-mixed and pre-milled $TiB_2$ precursors, i.e., pigment grade titanium dioxide ($TiO_2$) and boron oxide ($B_2O_3$), or boron carbide ($B_4C$) which are preferably added dry to the coke filler prior to addition of binder pitch. These reactants are then intimately mixed and well dispersed in the coke-pitch mixture and firmly bonded into place during the bake cycle. We have found that the reaction proceeds well at or above 1700° C., forming the bonded carbon-$TiB_2$ composite in situ. Here carbon includes graphite as well as amorphous carbon.

The normal method of production of monolithic carbonaceous pieces, either amorphous or graphitic carbon, involves a dry blend of several different particle sizes of coke and/or anthracite fillers and coke flour (50%–200 mesh) (79 mesh/cm), followed by a dispersion of these solid particulates in melted pitch to form a plastic mass which is then molded or extruded, then baked on a gradually rising temperature cycle to approximately 700°–1100° C. The bake process drives off the low boiling molecular species present, then polymerizes and carbonizes the pitch residue to form a solid binder-coke composite. If the material is to be graphitized, it is further heated to a temperature between 2000° C. and 3000° C. in a graphitizing furnace. A non-acicular or regular petroleum coke or calcined anthracite may be used to avoid a mismatch of the Coefficient of Thermal Expansion (CTE) of the $TiB_2$-coke mixture, or a needle coke may be used to form an anisotropic body.

The raw materials react in situ at temperatures above 1700° C. to form a carbon-$TiB_2$ composite according to the following reactions:

$$TiO_2 + B_2O_3 + 5C \rightarrow TiB_2 + 5CO$$

$$2TiO_2 + B_4C + 3C \rightarrow 2TiB_2 + 4CO.$$

It may also be seen that $B_4C$ may be formed as an intermediate step in the above.

$$2B_2O_3 + 7C \rightarrow B_4C + 6CO$$

We have found that our method produces a $TiB_2$-C composite in which the $TiB_2$ is of finer particle size and is better dispersed throughout the structure and is made at a much lower cost than by the addition of pure $TiB_2$ to the dry blend of coke particles and coke flour. It has been found easier to form $TiB_2$ in situ in graphite than to sinter $TiB_2$ powder into articles.

The composite articles produced in this manner have greatly improved thermal shock resistance as compared to pure $TiB_2$ articles, and greatly improved resistance to intercalation and corrosion by the molten salt bath as compared to carbon articles.

Other reactants may be used in place of $TiO_2$, $B_2O_3$ or $B_4C$, such as elemental Ti and B, or other Ti or B compounds or minerals. We prefer these compounds for their ready availability and low price, however, others may be more suitable, based on special conditions or changes in supply and price.

When manufacturing articles in this manner, it is preferred to impregnate the articles with a pitch and re-bake after the initial bake cycle. Alternately, the impregnation can be accomplished after heat treatment to 1700°–3000° C. Multiple impregnations may be advantageous. In this instance the reactions consume carbon from the coke and binder to form CO or $CO_2$, which escape, leaving the article highly porous, it is advantageous to impregnate one or more times and re-bake the article before or after heating at the high temperature cycle to densify, strengthen and decrease porosity. If the article is an electrode or component for a Hall cell, it may not be necessary to re-heat it to the 1700°–3000° C. range, after the final impregnation, but rather to the 700°–1100° C. range. If the article is to be used for an application requiring heat resistance or other properties of graphite, it is necessary to reheat it to a high temperature of 2000°–3000° C. to graphitize the coke remaining after this last impregnation.

Another unexpected advantage is found in that articles made in this manner may be molded or extruded, in contrast to the previously known methods of cold pressing and sintering. Extrusion particularly is preferred where large quantities are to be made. Molding and extrusion methods are preferable to cold pressing and sintering as more economical in practice, more adaptable for production of various shapes and not requiring as complex equipment.

Other useful sources of carbon include solvent refined coal cokes, metallurgical coke, and charcoals.

Preferred binders are coal tar and petroleum pitches, although other binders such as phenolic, furan and other thermosetting resins, and organic and natural polymers may also be used. The principal requirements are an ability to wet the dry ingredients and have a carbon residue on baking to 700°–1100° C.

DESCRIPTION OF THE INVENTION

A series of billets doped during mixing with $TiB_2$ precursors at 10 parts to 100 parts mix was molded and processed by heat treatments to 2400° C. and 2700° C. After extensive analyses by X-ray diffraction (XRD) and X-ray fluorescence (XRF), it was determined that a significant portion of $TiB_2$ was formed from $TiO_2$/$B_2O_3$ and $TiO_2$/$B_4C$ additives. Positive identification of the $TiB_2$ was made by XRD and distribution was observed by X-ray radiography.

Further trials resulted in the production of moldings and extrusions containing from 3.0–75% $TiB_2$ after heat treatment in coke particle-flour-pitch mixes.

The mix used above was a mixture of acicular coke particles and coke flour, bonded with about 25 parts per hundred 110° C. softening point coal tar pitch.

Various useful forms of carbon include the acicular needle type and regular types of petroleum coke, calcined anthracite, metallurgical coke and other selected mineral and vegetable carbons. Binders may be coal tar or petroleum pitches, with coal tar pitches preferred for their superior yield of carbon on coking.

The articles are formed by molding or extrusion. Cathode blocks for Hall cells are molded or extruded, however, tubular or cylindrical inserts for cathodes are most economically produced as extrusions.

Baking temperatures commonly reach from about 700° to 1100° C., with the practice normally followed in the examples below using a six day cycle, reaching a final temperature on a slowly rising curve typical of those normally followed in the electrode industry.

The acicular needle cokes, when heated to the graphitization temperatures of 2000°–3000° C., will form anisotropic graphite with coefficients of thermal expansion differing in at least two of the three geometric axes. Regular cokes will form isotropic graphite.

In our process, graphitization of the carbon and reaction of the $TiB_2$ precursors can occur simultaneously during graphitization, forming an intimately dispersed, well bonded, homogenous composite.

EXAMPLE 1

The following compositions were produced as modifications of a standard carbon electrode mix.

| Composition | A | B | C | D |
|---|---|---|---|---|
| Coke particles (acicular) | 1800 g | 1800 g | 1800 g | 1800 g |
| Coke flour (acicular) | 1200 g | 1200 g | 1200 g | 1200 g |
| Coal tar pitch (110° C. softening point) | 750 g | 750 g | 810 g | 810 g |
| Lubricant | 15 g | 15 g | 15 g | 15 g |
| $TiO_2$ | | 160 g | 223 g | |
| $B_2O_3$ | | 140 g | | |
| $B_4C$ | | | 77 g | |
| $TiB_2$ (99.5%) | | | | 300 g |
| Whole piece AD[1], g/cc | | | | |
| Green | 1.662 | 1.679 | 1.770 | 1.676 |
| Baked | 1.573 | 1.584 | 1.655 | 1.617 |
| Heated at 2400° C. | 1.425 | 1.393 | 1.494 | 1.498 |
| Heated at 2700° C. | 1.448 | 1.395 | 1.501 | 1.516 |
| XRD Scan | | | | |
| 2400° C. | C | C,TiB$_2$* | C,TiB$_2$* | C,TiB$_2$* |
| 2700° C. | C | C,TiB$_2$* | C,TiB$_2$* | C,TiB$_2$* |

[1]Apparant Density
*Weak, unidentified lines in X-ray diffraction.

The compositions above were made by premilling and blending the $TiB_2$ or the reactants with the coke particles and coke flour in a heated mixer, then the pitch was added, melted and the blend mixed while hot. A larger amount of pitch was added in C and D above to compensate for the increased surface area and binder demand of these blends. The pieces were molded using a pressure of 2000 psi (140.6 kg/cm$^2$) on a 3¾ in. (9.5 cm) diameter molding, baked to about 700° C., then transferred to a graphitizing furnace, and heated to 2400° or 2700° C.

Results from X-ray diffraction and X-ray radiography indicate a significant amount of $TiB_2$ formation from the reactants in B and C above, at a calculated level of 7.38%.

EXAMPLE 2

The following compositions were made with higher concentrations of $TiB_2$ and precursors than in Example 1. The additives were incorporated at 100 pph level in the heated coke mix before the addition of binder. The formulations were mixed in a heated sigma mixer, molded at 2000 psi (140.6 kg/cm$^2$) for 5 minutes at 113°–116° C., and baked to about 700° C., in a six day cycle, with results as follows:

| Composition, pbw | E | F | G | H |
|---|---|---|---|---|
| Coke particles[1] | 60 | 60 | 60 | 60 |
| Coke flour[2] | 40 | 40 | 40 | 40 |
| Coal tar pitch | 25 | 41.7 | 41.7 | 36.7 |
| Lubricant | 0.5 | 0.8 | 0.8 | 0.8 |
| $TiO_2/B_2O_3$[3] | | 100 | | |
| $TiO_2/B_4C$[4] | | | 100 | |
| $TiB_2$ (99.5%) | | | | 100 |
| $TiB_2$, calculated % | | 46.8 | 32.2 | 42.2 |
| Whole piece AD, g/cc | | | | |
| Green | 1.682 | 1.943 | 2.118 | 2.134 |
| Baked | 1.531 | 1.593 | 2.075 | 2.097 |
| Heated-2400° C. | 1.450 | 1.104 | 1.605 | 1.974 |
| Approx. $TiB_2$ (XRD) % | trace | 3.4 | 34 | 28 |
| Contaminants identified by XRD | | $TiO_2$, TiC | TiC | TiC |
| Condition after 2400° C. | OK | weak, porous | weak, porous | OK |

[1]Av. diam. 3 mm acicular coke
[2]52% min. −200 mesh acicular
[3]In stoichiometric ratio according to the equation $TiO_2 + B_2O_3 + 5 C \rightarrow TiB_2 + 5 CO$.
[4]In stoichiometric ratio according to the equation $2 TiO_2 + B_4C + C \rightarrow 2 TiB_2 + 2 CO_2$.

EXAMPLE 3

Moldings were made using coke flour and $TiB_2$ at various percentages with results as follows, after mixing, molding and baking as in Example 1.

| Composition, pbw | I | J | K | L | M | N |
|---|---|---|---|---|---|---|
| Coke flour, isotropic | 80.1 | 61.4 | 37.8 | | | |
| Coke flour, acicular | | | | 79.9 | 61.4 | 37.8 |
| $TiB_2$ (90.9%) | 19.9 | 38.6 | 62.2 | 20.1 | 38.6 | 62.2 |
| Coal tar pitch | 38 | 32 | 27 | 38 | 32 | 27 |
| Lubricant | 1 | 1 | 1 | 1 | 1 | 1 |
| Calc. $TiB_2$ | 15 | 30 | 50 | 15 | 30 | 50 |
| Whole piece AD, g/cc | | | | | | |
| Green | 1.818/ 1.817 | 1.988/ 1.989 | 2.307/ 2.294 | 1.866/ 1.857 | 2.024/ 2.005 | 2.322 |
| Baked | 1.733/ 1.742 | 1.931/ 1.918 | 2.237/ 2.213 | 1.693/ 1.702 | 1.900/ 1.863 | 2.242 |
| Impregnated, wt. % pickup[1] | 7.4 | 3.6 | 0.6 | 7.8 | 1.4 | 1.6 |
| Rebaked AD, g/cc | 1.81 | 1.981/ 1.979 | 2.258 | 1.763/ 1.793 | 1.927/ 1.908 | 2.261 |
| Heated to 2400° C., AD | 1.84 | | 2.263 | | | 2.217 |
| $TiB_2$ by XRD, % | 7 | | 24 | | | 19 |

[1]Impregnated with petroleum pitch with a softening point of 115°–120° C. and rebaked to about 700° C.

Two moldings were made for most of the above formulations, molded at 2000 psi (140.6 kg/cm$^2$) for 5 minutes at die temperatures of 115°–120° C.

EXAMPLE 4

Pieces were formed by extrusion of mixtures made according to the procedure of Example 1, with the following compositions and results.

| Composition, parts by weight | O | P |
|---|---|---|
| Isotropic coke flour | 60.6 | 60.6 |
| $TiB_2$ (90.9%) | 39.4 | 39.4 |
| Coal tar pitch | 32 | 32 |
| Lubricant | 1.5 | 1.5 |
| $TiB_2$, calculated % | 29.5 | 29.5 |
| Whole piece AD, g/cc | | |
| Green | 1.962 | 1.973 |
| Baked | 1.891 | 1.902 |
| Extrusion conditions | | |
| Mud pot °C. | 115–120° C. | 115–120° C. |
| Die temperature, °C. | 110 | 110 |
| Extrusion pressure (psi) | 500 | 500 |
| (kg/cm$^2$) | 35 | 35 |

EXAMPLE 5

Moldings were made as in Example 1 with the following compositions:

| Composition, pbw | Q | R | S | T | U |
|---|---|---|---|---|---|
| Coke flour, isotropic | | 15 | 52.5 | 71.3 | 50 |
| $TiB_2$ - 99.9%[1] | 100 | 85 | | | |
| $TiO_2$ | | | 35.3 | 21.3 | 15 |
| $B_4C$ | | | 12.2 | 7.4 | |
| Borax | | | | | 35 |
| Pitch, 110° C. | 21 | 24 | 32 | 38 | 25 |
| Green Whole piece AD, g/cc | 3.050 | 2.750 | 2.040 | 1.850 | 1.820 |
| Calculated $TiB_2$ % | 88%[2] | 74%[2] | 31%[2,3] | 19%[2,3] | 41%[2,4] |

[1] Very high purity $TiB_2$, 99.9% + assay.
[2] Assuming 65% coke yield on coal tar pitch after baking to 700°–1100° C. range.
[3] Assuming reactions as in Example 2
[4] Assuming the reaction: $2\ TiO_2 + Na_2B_4O_7 \cdot 10\ H_2O + 10\ C \rightarrow 2\ TiB_2 + Na_2O + 10\ H_2O + 10\ CO$.

We claim:

1. A process for the production of $TiB_2$-carbon composite comprised of the steps of mixing and dispersing particulate carbonaceous matter and $TiB_2$-forming reactants in a carbon-forming binder to form a plastic mixture, forming a shaped article from said mixture, baking said article at 700° to 1100° C., impregnating said baked article with a carbon-forming binder and rebaking said article to 700° to 1100° C.

2. A process for the production of a $TiB_2$-carbon composite article comprised of the steps of mixing and dispersing particulate carbonaceous matter and $TiB_2$-forming reactants in a carbon-forming binder to form a plastic mixture, forming a shaped article from said mixture, baking said article to 700° to 1100° C., heating said article to a $TiB_2$-forming temperature from 2000° to 3000° C. wherein the composite article is impregnated with a carbon-forming binder and is re-baked to 700° to 1100° C.

3. A process for the production of a $TiB_2$-carbon composite article comprised of the steps of mixing and dispersing particulate carbonaceous matter and $TiB_2$-forming reactants in a carbon-forming binder to form a plastic mixture, forming a shaped article from said mixture, baking said article to 700° to 1100° C., further heating said article to a $TiB_2$-forming temperature of 2000° to 3000° C. wherein the composite article is then impregnated with a carbon-forming binder, re-baked to 700° to 1100° C. and re-heated to 2000° to 3000° C.

* * * * *